United States Patent
Glaser

(10) Patent No.: US 7,967,362 B2
(45) Date of Patent: Jun. 28, 2011

(54) MOTOR VEHICLE WITH A PROTECTIVE SUNSCREEN FOR THE WINDOWPANE

(75) Inventor: Carsten Glaser, Mühltal (DE)

(73) Assignee: GM Global Technology Operations LLC, Detroit, MI (US)

( * ) Notice: Subject to any disclaimer, the term of this patent is extended or adjusted under 35 U.S.C. 154(b) by 65 days.

(21) Appl. No.: 12/427,505

(22) Filed: Apr. 21, 2009

(65) Prior Publication Data

US 2009/0315361 A1 Dec. 24, 2009

(30) Foreign Application Priority Data

Apr. 24, 2008 (DE) .................. 10 2008 020 528

(51) Int. Cl.
*B60J 3/02* (2006.01)

(52) U.S. Cl. ............... 296/97.4; 296/97.8; 296/97.11; 160/370.22

(58) Field of Classification Search ............ 296/97.4, 296/97.8, 97.11, 97.9, 98, 26.09; 160/370.22
See application file for complete search history.

(56) References Cited

U.S. PATENT DOCUMENTS

| | | | |
|---|---|---|---|
| 4,738,481 A | | 4/1988 | Watjer et al. |
| 7,237,817 B2 * | | 7/2007 | Kobylski et al. ........ 296/26.09 |
| 2004/0160082 A1 * | | 8/2004 | Bohm et al. ........... 296/97.11 |
| 2006/0022491 A1 | | 2/2006 | Lin |
| 2009/0072574 A1 * | | 3/2009 | Tominaga et al. ....... 296/97.4 |

FOREIGN PATENT DOCUMENTS

| | | |
|---|---|---|
| DE | 917654 C | 9/1954 |
| DE | 2113919 A1 | 10/1972 |
| DE | 19856868 A1 | 6/2000 |
| DE | 102005056332 A1 | 5/2007 |
| DE | 102007009980 A1 | 12/2007 |
| DE | 202007017919 U1 | 3/2008 |
| EP | 1 201 473 A2 * | 9/2001 |
| EP | 1495889 A2 | 1/2005 |
| EP | 2020322 A1 | 2/2009 |
| EP | 2039550 A2 | 3/2009 |
| WO | 2005113274 A1 | 12/2005 |

OTHER PUBLICATIONS

German Patent Office, German Search Report for German Application No. 102008020528.1, Nov. 20, 2008.

* cited by examiner

*Primary Examiner* — Joseph D Pape
(74) *Attorney, Agent, or Firm* — Ingrassia Fisher & Lorenz, P.C.

(57) ABSTRACT

A motor vehicle is provided that includes, but is not limited to a windowpane and a protective sunscreen for the windowpane, and the protective sunscreen exhibits a cover that can be moved from a non-use position into a use position, in which the cover at least partially covers the windowpane. The cover exhibits a rigid load-bearing section that accommodates at least one sun visor, which can be moved from a non-use position into a use position.

18 Claims, 3 Drawing Sheets

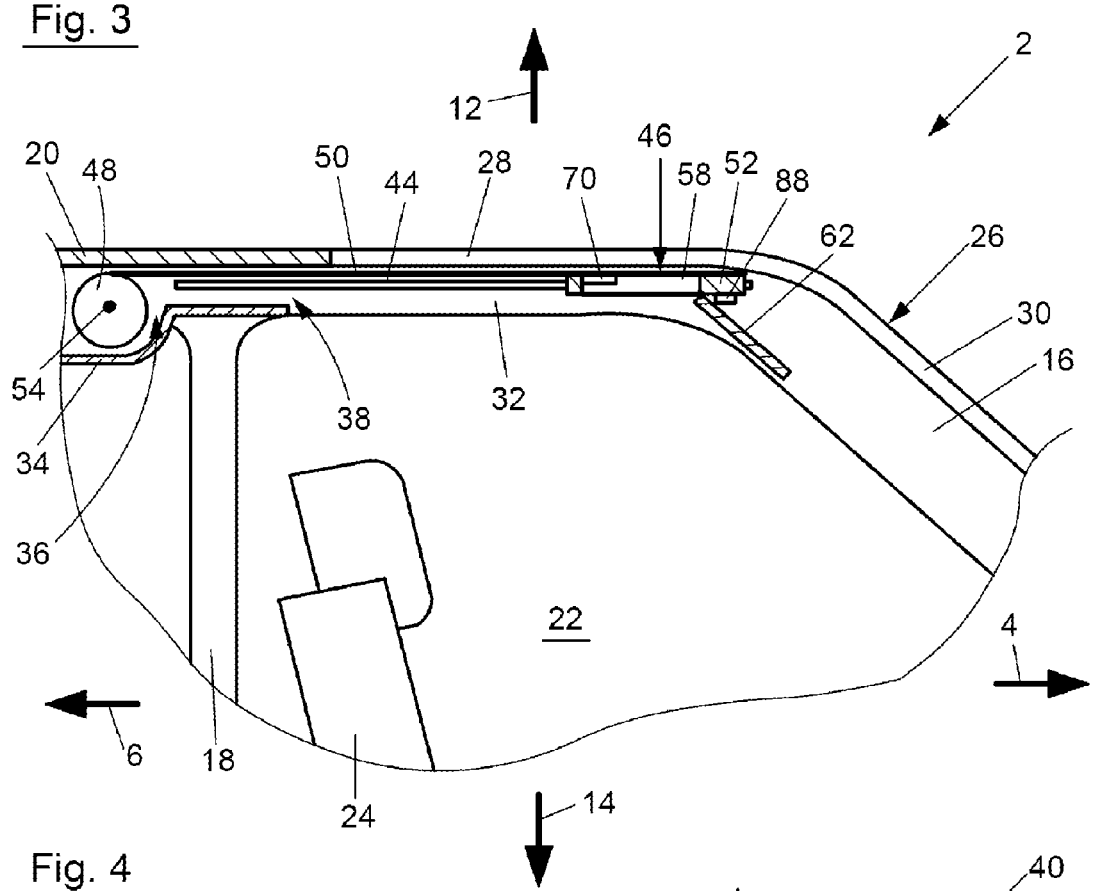

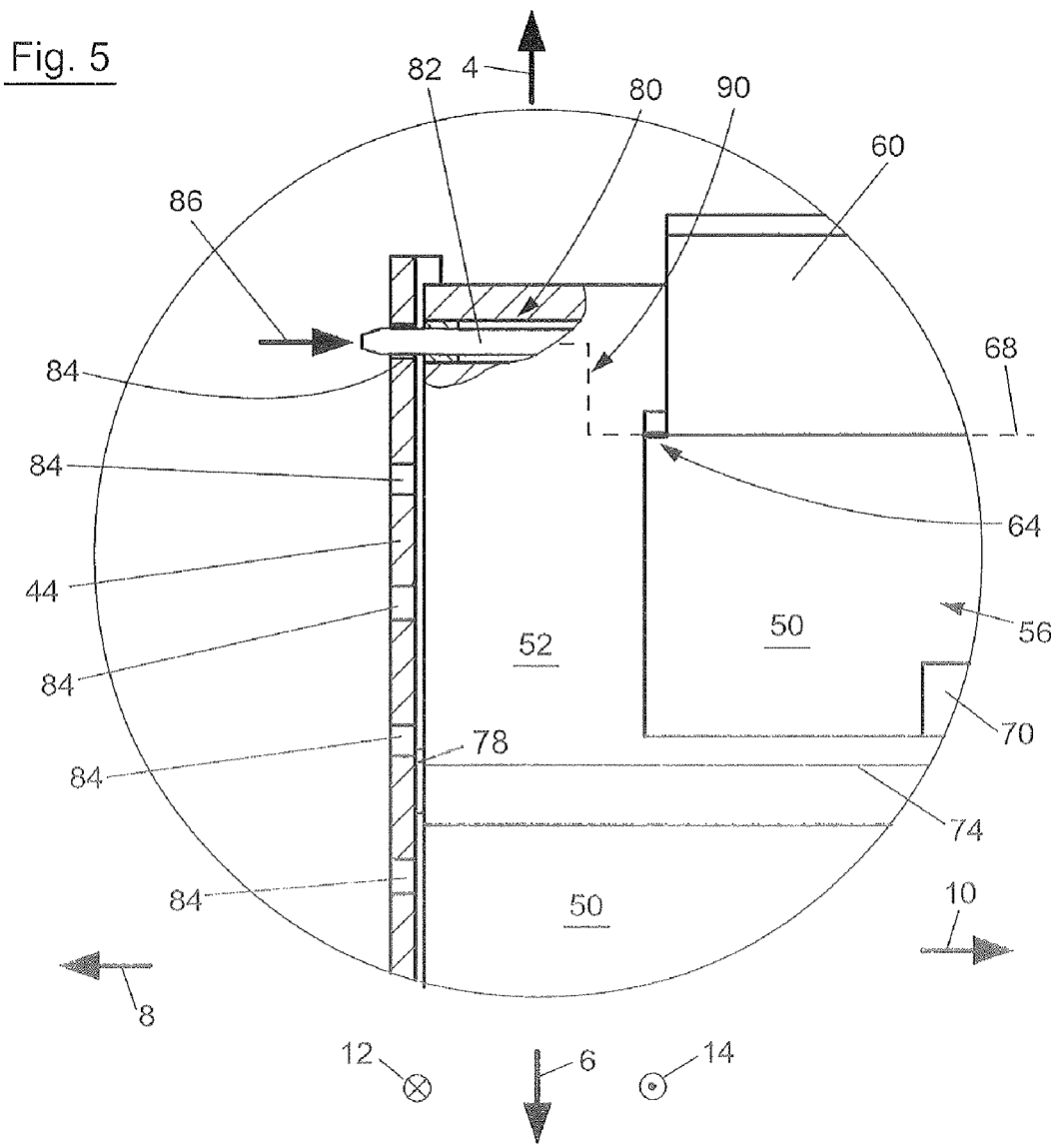

MOTOR VEHICLE WITH A PROTECTIVE SUNSCREEN FOR THE WINDOWPANE

CROSS-REFERENCE TO RELATED APPLICATION

This application claims priority to German Patent Application No. 102008020528.1, filed Apr. 24, 2008, which is incorporated herein by reference in its entirety.

TECHNICAL FIELD

The present invention relates to a motor vehicle with a windowpane and a protective sunscreen for the windowpane, and the protective sunscreen exhibits a cover that can be moved from a non-use position to a use position, in which the windowpane is at least partially covered by the cover.

BACKGROUND

Known from prior art are motor vehicles that exhibit a protective sunscreen for the windowpane, for example a sunroof pane or windshield. The known protective sunscreens generally encompass a cover formed by a roller-deployable tarpaulin. In this way, the cover can be deployed from a non-use position to a use position. In the non-use position, the cover is accommodated in a retaining area provided between the roof ceiling on the one hand and the vehicle roof on the other. In order to move the cover from the non-use position into the use position, it need only be deployed from the retaining area. In the use position, the cover partially or entirely covers the windowpane allocated to the protective sunscreen. In the use position, the cover thereby prevents the sunlight incident upon the windowpane from heating up the vehicle interior or blinding the passengers. In addition, the known motor vehicles exhibit so-called sun visors that are designed separately from the protective sunscreen cover. These sun visors, which are routinely provided for both the driver and front passenger of the motor vehicle, can be moved or swiveled from a non-use position into a use position independently of the protective sunscreen cover.

The known motor vehicle interior arrangements, which exhibit both a protective sunscreen with a cover as well as sun visor, have proven effective, but are disadvantageous in that they limit any especially flexible manipulation and arrangement of the sun visors inside the motor vehicle.

Therefore, at least one object of the present invention is to provide a motor vehicle with a protective sunscreen and at least one sun visor, which enables an especially flexible manipulation and arrangement of the sun visor inside the motor vehicle. In addition, other objects, desirable features, and characteristics will become apparent from the subsequent summary and detailed description, and the appended claims, taken in conjunction with the accompanying drawings and the foregoing technical field and background.

SUMMARY

The motor vehicle according to an embodiment the invention first exhibits a windowpane, which can be a sunroof pane, a windshield or panoramic window. The motor vehicle further exhibits a protective sunscreen for this windowpane, and the protective sunscreen has a cover. This cover can be moved from a non-use position to a use position, in which the cover at least partially covers the windowpane. The cover exhibits a rigid load-bearing section that accommodates at least one sun visor, which can also be moved from a non-use position into a use position. For example, the load-bearing section can be understood as a rigid transverse beam, a rigid transverse rod or the like.

In the motor vehicle according to an embodiment of the invention, the rigid load-bearing section is what initially makes it possible to reliably secure the sun visor to the cover. In addition, the sun visor arranged on the rigid load-bearing section can hence be moved along with the cover of the protective sunscreen from the non-use position into the use position. As a result, this advantageous combination of protective sunscreen and sun visor enables a particularly flexible arrangement of not only the cover inside the motor vehicle, but also of the sun visor. For example, if the sun visor is not needed, it can be moved together with the cover of the protective sunscreen into the non-use position, and need not permanently be arranged in the same position inside the vehicle. The space permanently occupied by the sun visor in the non-use position in conventional vehicles can also be used for some other purpose.

In an advantageous embodiment of the motor vehicle according to the invention, the rigid load-bearing section is designed like a plate. The plate-like design of the rigid load-bearing section enables an especially practical attachment of the sun visor to the cover on the one hand, and ensures a reliable protection against incident light on the other.

The cover could essentially consist exclusively of the rigid load-bearing section. However, in order to achieve an especially space-saving arrangement of the cover when the latter is in the non-use position, the cover also exhibits a deployable tarpaulin secured to the load-bearing section in an advantageous embodiment of the motor vehicle according to the invention. Since the deployable tarpaulin of the cover serves only to cover the windowpane and must not accommodate a sun visor, the latter should or would preferably have to be less rigid or more flexible in design as the rigid load-bearing section.

In order to ensure a space-saving arrangement of the sun visor in the non-use position, the load-bearing section exhibits a depression or recess that accommodates the sun visor in the non-use position in a preferred embodiment of the motor vehicle according to the invention. For example, the sun visor should be arranged in the depression or recess when in the non-use position in such a way as not to project over the opening of the depression or recess facing the vehicle interior. This makes it possible to reliably prevent a collision between the sun visor in the non-use position and part of the body of the vehicle passengers or another component inside the motor vehicle as the cover is moved from the use position into the non-use position or vice versa.

If the load-bearing section has a depression for the sun visor, the floor of the depression will inevitably be formed by part of the load-bearing section. In this case, the floor of the depression itself prevents light from penetrating the depression while the cover is in the use setting and the sun visor in the use position. Of course, this type of floor is initially not provided for a recess inside the load-bearing section. However, in order to prevent light from penetrating the recess in such a case too, the tarpaulin is secured to the load-bearing section in such a way that the tarpaulin covers the recess on its side facing the windowpane in another preferred embodiment of the motor vehicle according to the invention. This makes it especially simple to manufacture the load-bearing section, which must subsequently only be secured to the tarpaulin in the described manner.

In another preferred embodiment of the motor vehicle according to the invention, the protective sunscreen exhibits two opposing guide rails in which the load-bearing section can slide, thereby enabling the cover to move especially easily from the non-use position into the use position or vice versa. In addition, if provided, the tarpaulin can also be guided in the two opposing guide rails. For example, such guide rails can be provided on the roof frame of the motor vehicle or integrated with the latter as a single piece.

In another preferred embodiment of the motor vehicle according to the invention, the load-bearing section further accommodates a lighting means for illuminating the vehicle interior and/or the sun visor. The rigid load-bearing section makes it possible to also arrange the lighting means, which can be an electric lamp, for example, on the movable cover. By contrast, there are only limited possibilities, if any, for arranging a lighting means on a tarpaulin of the cover, especially since this can result in the tarpaulin sagging downward owing to its greater flexibility and the weight of the lighting means.

In order to prevent the lighting means from colliding with another component inside the motor vehicle or part of the body of a vehicle passenger as the cover shifts between the use and non-use positions, the lighting means is arranged inside the depression or recess in another especially advantageous embodiment of the motor vehicle according to the invention.

In another advantageous embodiment of the motor vehicle according to the invention, the load-bearing section is provided with sliding contacts and lines to supply the lighting means with power via the guide rails, sliding contacts and lines. This arrangement would also be hard to realize in a cover consisting essentially of a tarpaulin, since the sliding contacts and lines would have to be provided on the tarpaulin of the cover, so that the rigid load-bearing section also positively impacts the manufacture of the cover in this case too.

In order to realize a particularly space-saving arrangement of the load-bearing section with the cover in the non-use position, another preferred embodiment of the motor vehicle according to the invention further provides for a retaining area between a roof ceiling on the one hand and a vehicle roof on the other, and the load-bearing section is at least partially arranged in the retaining area with the cover in the non-use position.

In another advantageous embodiment of the motor vehicle according to the invention, the sun visor is completely housed in the retaining area in the non-use position, provided the cover is in the non-use position.

To prevent the cover of the protective sunscreen from undesirably moving under normal driving situations and potentially impeding the view of the driver, another preferred embodiment of the motor vehicle according to the invention provides for a latching mechanism to latch the cover in various positions. The latching mechanism can here be designed in such a way as to enable latching in preferably any position, thereby enabling an especially precise adjustment to the wishes of the respective vehicle passengers.

In order to be able to incorporate an especially stable latching mechanism into the cover, another preferred embodiment of the motor vehicle according to the invention provides the latching mechanism on the load-bearing section. By contrast, it would not be advisable to secure the latching mechanism, which can encompass heavy components, just to the tarpaulin of the cover alone, especially since this can again cause the tarpaulin to sag when in the use position. In addition, a latching mechanism in the area of the tarpaulin would pose complications in rolling the tarpaulin up, and hence stowing it in a space-saving manner with the cover in the non-use position.

In another advantageous embodiment of the motor vehicle according to the invention, the latching mechanism exhibits moving locking bars, for example designed as bolts or rods. When in the latched position, the moving locking bars are accommodated in recesses or depressions in the guide rails. The latching mechanism can be released by again retracting the moving locking bars from the recesses or depressions.

The locking bars are pre-loaded in the latched position so that the cover can be latched in the respective position in an especially reliable manner, without the cover shifting forward, for example during an accident. For example, simple spring elements can here be provided for pre-loading purposes.

In an especially preferred embodiment of the motor vehicle according to the invention, the sun visor interacts with the latching mechanism in such a way that the cover can only be moved from the use to the non-use position if the sun visor is also in the non-use position. This ensures that the cover can only be moved form the use to the non-use position if the sun visor is in the non-use position, thereby reliably precluding a collision between the sun visor in its use position with another component inside the motor vehicle, for example, the roof ceiling, or part of the body of a vehicle passenger. As a result, both the sun visor and other components inside the motor vehicle are protected against damage, while the risk of injury to vehicle passengers is low. For example, this can be realized by making it impossible to release the latching mechanism until the sun visor has been moved back into the non-use position.

In another advantageous embodiment of the motor vehicle according to the invention, an actuator (e.g., a lever, a button or the like), is arranged on the load-bearing section for activating the latching mechanism. In this way, the latching mechanism can be latched or released by activating the actuator. However, this embodiment can also provide that the latching mechanism can only be released when the sun visor is in the non-use position.

To ensure that the actuator can be readily accessed by the vehicle passengers at any time regardless of the cover position, the actuator can be accessed with the cover in the non-use position, preferably outside the retaining area, in another especially preferred embodiment of the motor vehicle according to the invention. As a result, the roof ceiling limiting the retaining area does not impede the good accessibility of the actuator.

In another especially advantageous embodiment of the motor vehicle according to the invention, the windowpane is a sunroof windowpane, a windshield or panoramic window. In the alternative cited last, the panoramic window preferably encompasses a roof pane section and a front pane section, which are advantageously joined together as a single piece. In the latter case, the cover with the sun visor arranged on the load-bearing section is particularly advantageous, especially since a conventional sun visor would otherwise have to be situated on the panoramic window itself, where the sun visor limits the view of the vehicle passengers through the panoramic window on the one hand, and represents an impediment when removing the cover from the non-use position into the use position.

BRIEF DESCRIPTION OF THE DRAWINGS

The present invention will hereinafter be described in conjunction with the following drawing figures, wherein like numerals denote like elements, and:

FIG. 3 is the motor vehicle on FIG. 1 with the cover in the use setting and the sun visor in the use position;

FIG. 4 is a bottom view of the protective sunscreen on FIG. 3; and

FIG. 5 is a detailed and enlarged view of the section A on FIG. 4, partially cut view.

DETAILED DESCRIPTION

The following detailed description is merely exemplary in nature and is not intended to limit application and uses. Furthermore, there is no intention to be bound by any theory presented in the preceding background and summary or the following detailed description.

Figure 1:
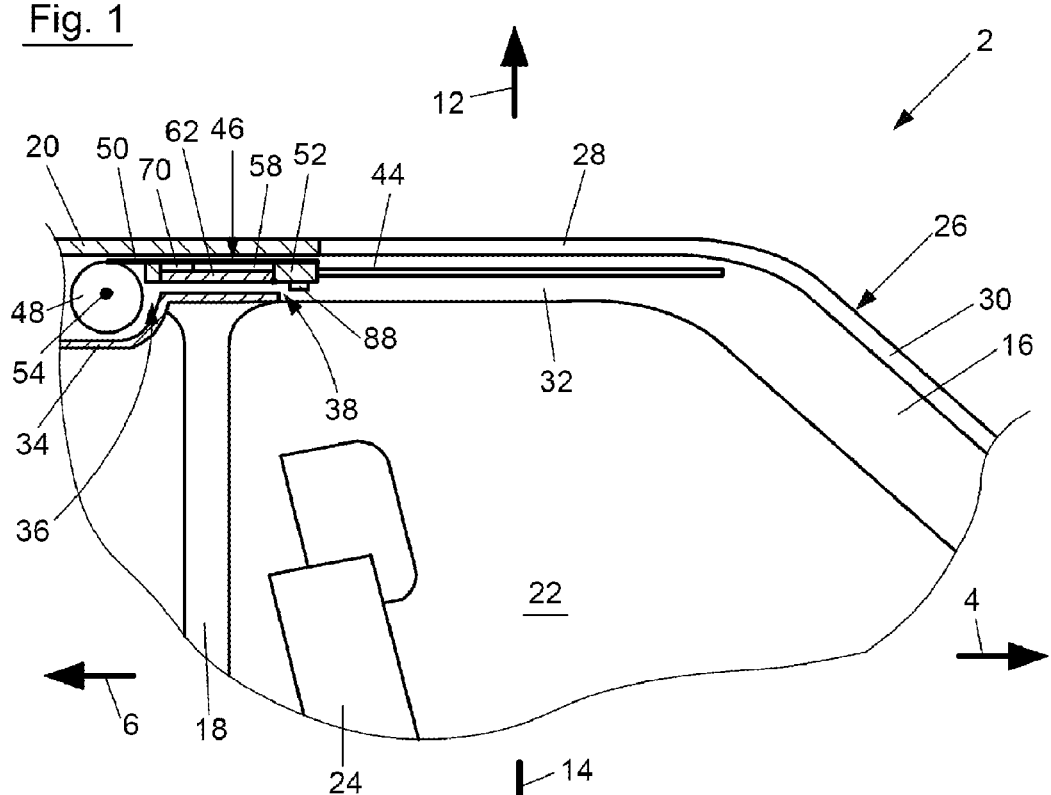
FIG. 1 is a partial side view of an embodiment of the motor vehicle according to the invention with the cover in the non-use position.

FIG. 1 shows a cross section through an embodiment of the motor vehicle 2 according to the invention. The arrow 4 in the figures denotes the forward direction of the motor vehicle 2, while the arrow 6 represents the backward direction. Further, arrows 8 and 10 denote the transverse directions, while arrows 12 and 14 represent the height directions.

The motor vehicle 2 exhibits a body, which among other things has two A columns 16 spaced apart from each other in a transverse direction 8 and 10, and two B-columns 18 spaced apart from each other in the transverse direction 8 and 10, only a respective one of which is depicted on FIG. 1. In this case, the B-column 18 is arranged in the backward direction 6 behind the A-column 16. The body further exhibits a vehicle roof 20, which upwardly borders the vehicle interior 22 in the height direction 12 in a rear area. FIG. 1 also depicts the backrest of a vehicle seat (e.g., driver's seat 24), which is situated in a front area of the vehicle interior 22.

The vehicle interior 22 is bordered in the height direction 12 and forward direction 4 by a panoramic windowpane 26 in the area of the vehicle interior 22 where the driver's seat 24 or the entire front seat row is located. The panoramic windowpane 26 encompasses a roof pane section 28, which abuts the vehicle roof 20 in the backward direction 6, and a front pane section 30 that forms a windshield (i.e., the roof pane section 28 and front pane section 30 are joined to form a single piece). The panoramic windowpane 26 extends in the transverse directions 8 and 10, preferably from the one roof frame 32 to the opposing roof frame, or from the A-column 16 to the opposing A-column, so that the vehicle passengers in the first seat row, which includes the driver's seat 24 too, have a panoramic view through the panoramic windowpane 26. A roof ceiling 34 is secured below the vehicle roof 20 in the height direction 14. In this case, a retaining area 36 is formed in the height direction 12 or 14 between the roof ceiling 34 on the one hand and the vehicle roof 20 on the other. The retaining area 36 can be accessed via a gap 38 that is formed in the transverse direction 8 and 10 between the roof ceiling 34 and the vehicle roof 20, and points in the forward direction 4.

The motor vehicle 2 further exhibits a protective sunscreen 40 that will be described in greater detail below drawing reference to FIG. 1 and FIG. 2. The protective sunscreen 40 initially exhibits two guide rails 42, 44 opposing each other in the transverse direction 8 and 10, which each extend along the roof frame 32 in the forward and backward direction 4, 6 of the motor vehicle 2. As an alternative, the guide rails 42, 44 can also extend along the A-columns 16, so that the front pane section 30 can also be covered by means of the protective sunscreen 40. The guide rails 42, 44 can also be designed as a single piece with the roof frame 32 and potentially the A-column 16, or be secured to the roof frame 32 or A-column 16 after the fact.

The protective sunscreen 40 further exhibits a cover 46. In the embodiment shown, the cover 46 encompasses a rearward flexible tarpaulin 50 in the backward direction 6 that can be deployed from a roller 48, and a frontal, rigid load-bearing section 52 in the forward direction 4. The deployable end of the tarpaulin 50 is secured to the load-bearing section 52. The roller 48 is arranged inside the retaining area 36 between the roof ceiling 34 and the vehicle roof 20, and can be turned around a rotational axis 54 extending in a transverse direction 8 and 10, so as to deploy the load-bearing section 52 along with the tarpaulin 50.

The rigid load-bearing section 52 designed as a plate in this embodiment continuously extends in the transverse direction 8 and 10, and is laterally mounted in the guide rails 42 and 44 in such a way that the load-bearing section 52 can be shifted in the forward and backward direction 4, 6. The tarpaulin 50 is continuous in the transverse directions 8 and 10, and its edges pointing in the transverse directions 8 and 10 can be guided in the guide rails 42, 44 while deploying the tarpaulin 50.

Figure 2:
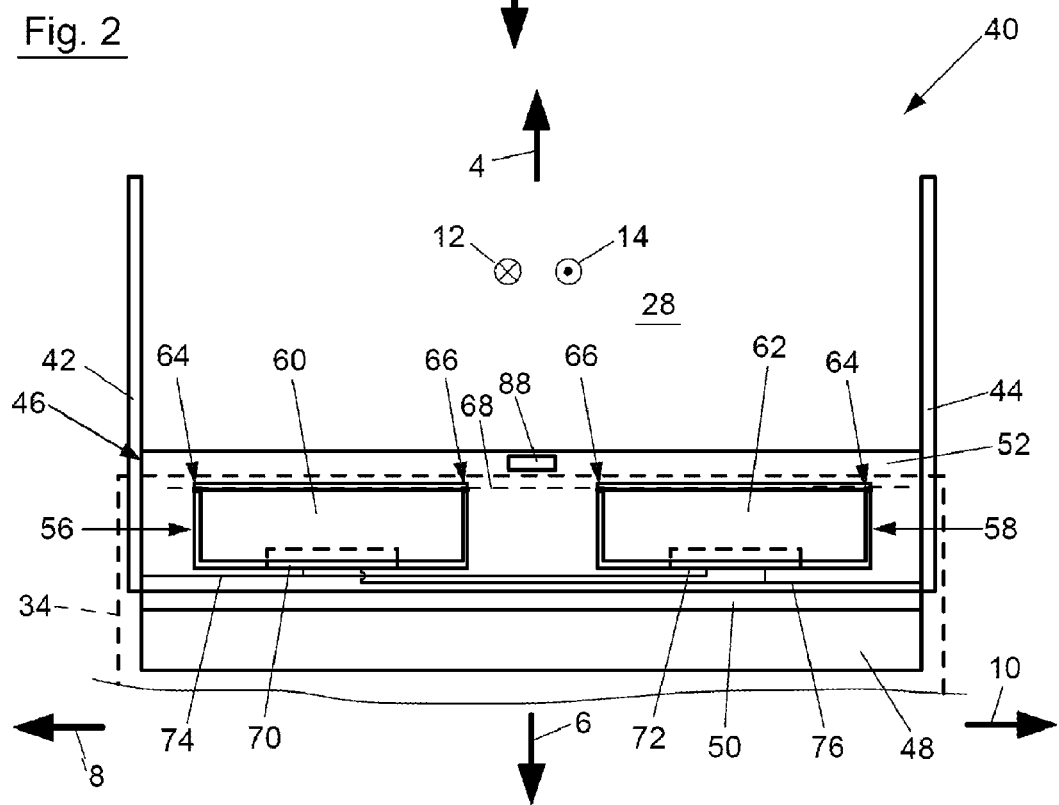
FIG. 2 is a bottom view of the protective sunscreen on FIG. 1.

The plate-shaped load-bearing section 52 further incorporates two recesses 56, which each serve to accommodate a sun visor 60, 62 when the sun visors 60, 62 are moved to the non-use position depicted on FIG. 1 and FIG. 2. The sun visors 60, 62 are also plate-shaped, and each secured to the load-bearing section 52 via an outer first hinge 64 and an inner second hinge 66, so that the sun visors 60, 62 can be swiveled around a pivoting axis 68 from the non-use position shown on FIG. 1 and FIG. 2 into a use position shown on FIG. 3 to FIG. 5, and the pivoting axis 68 extends in the transverse direction 8 and 10. In addition, the sun visors 60, 62 can be detached from the load-bearing section 52 in the area of the second hinge 66, so that the outer first hinge 64 allows the sun visor 60, 62 to swivel around additional pivoting axes, for example a pivoting axis in the height direction 12 and 14, as denoted on the right side of FIG. 4.

The recesses 56, 58 also incorporate a lighting means 70, 72, which can be designed as a lamp, for example, and serves to illuminate the vehicle interior 22 or the sun visor 60, 62. The lighting means 70, 72 can each be supplied with power via a first and second electric line 74, 76, and the lines 74, 76 are provided on the load-bearing section 52. A sliding contact 78 on the load-bearing section 52 establishes electrical contact between the line 74 and guide rail 42, while a sliding contact establishes a corresponding electrical contact between the line 76 and guide rail 44. The sliding contact 78 is shown by example on FIG. 5. As a result, a permanent power supply to the lighting means 70, 72 can be ensured by applying a voltage between the guide rail 42 and guide rail 44.

Both the lighting means 70, 72 and the sun visor 60, 62 in the non-use position are arranged inside the recess 56, 58 in such a way as not to project over the upper or lower side of the plate-shaped load-bearing section 52. In addition, the tarpaulin 50 is secured to the load-bearing section 52 in such a way that the tarpaulin 50 covers recess 56, 58 on its side facing the windowpane 26 or the vehicle roof 20. This makes it especially simple to manufacture both the load-bearing section 52 along with the protective sunscreen 40.

Before discussing precisely how the protective sunscreen 40 functions in greater detail, another feature of the depicted embodiment will be explained in further detail below, drawing reference to FIG. 5. The protective sunscreen 40 exhibits a latching mechanism 80 arranged on the load-bearing section 52, which can be used to latch the cover 46 in various positions. The latching mechanism 80 here exhibits rod-shaped locking bars 82 that can be moved in the transverse direction 8 and 10, and are incorporated in recesses 84 in the latched position shown on FIG. 5, and the recesses 84 are formed in the guide rails 42, 44. In order to move the locking bar 82 in the transverse direction 8 and 10 from the depicted latched position into a non-latched position, as denoted by the arrow 86 on FIG. 5, the vehicle passenger need only activate an actuator 88 provided on the load-bearing section 52 and shown on FIG. 1 to FIG. 4. To reliably hold the locking bar 82 in the latched position, the locking bar 82 is pre-loaded in the latched position by means of a spring element (not shown). After reaching the non-latched position, the load-bearing section 52 or cover 46 can be shifted in directions 4 and 6.

The function and additional features of the protective sunscreen 40 will be explained in more detail below, drawing reference to FIG. 1 to FIG. 5. The cover 46 is in the non-use position on FIG. 1 and FIG. 2 (i.e., the cover 46 does not cover the roof pane section 28 of the panoramic windowpane 260. In the non-use position, the load-bearing section 52 is essentially arranged inside the retaining area 36 between the roof ceiling 34 and vehicle roof 20 in relation to the directions 4, 6. The deployable edge of the load-bearing part 52 pointing in direction 4 here projects far enough out of the gap 38 that the actuator 88 does not come to lie inside the retaining area 36, and hence can is especially convenient to access by the vehicle passenger (i.e., the roof ceiling 34 does not cover the actuator 88). If the cover 46 is in the non-use position according to FIG. 1 and FIG. 2, the sun visors 60, 62 in the non-use position are completely housed in the retaining area 36, and hence hidden from the view of the vehicle passengers.

If the vehicle passenger in the driver's seat 24 or in the first seat row is blinded by sunlight radiating through the panoramic windowpane 26, he need only activate the actuator 88 to release the latching mechanism 80 (FIG. 5) and subsequently advance the cover 46 along the guide rails 42, 44 in the forward direction 4. In the use position of the cover 46 achieved as a result and depicted on FIG. 3 and FIG. 4, the cover 46 covers the roof pane section 28 of the panoramic windowpane 26, so that the driver can no longer be blinded by sunlight through the roof pane section 28. After the actuator 88 is released, the latching mechanism 80 again latches the cover 46 in the use position by virtue of the locking bar 82 pre-loaded in the latched position, as evident from FIG. 5. The vehicle passenger can now also swivel the sun visor 60, 62 from the non-use position, in which the sun visor 60, 62 is tucked away in the recesses 56, 58, around the pivoting axis 68 and into the use position depicted on FIG. 3 and FIG. 4, in which the sun visors 60, 62 cover the front pane section 30 or also another windowpane of the motor vehicle 2.

If the vehicle passenger no longer requires the cover 46 or sun visors 60, 62, he can slide the cover 46 and sun visors 60, 62 back into the non-use position shown on FIG. 1 and FIG. 2. However, this cannot be done in each position of the sun visor 60, 62. Rather, the sun visor 60, 62 interacts with the latching mechanism 80 in such a way that the cover 46 can only be moved from the use to non-use position if the sun visor 60, 62 is in the non-use position. To this end, there is an active connection between the sun visor 60, 62 and latching mechanism, which is denoted by a dashed line 90 on FIG. 5. This active connection 90 in the present embodiment prevents the locking bar 82 from transversely shifting from the latched position (FIG. 5) into a non-latched position until the sun visor 60, 62 has been swiveled back to the non-use position. Only then can the latching mechanism 80 be released using the actuator 88, so as to slide the cover 46 back into the non-use position. This makes it possible to reliably prevent the sun visor 60, 62 from colliding with the roof ceiling 34 in the area of the gap 38 and becoming damaged while sliding back the cover 46.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A motor vehicle, comprising:
   a windowpane;
   a protective sunscreen for the windowpane;
   a cover for the protective sunscreen adapted for movement from a non-use position into a use position, in which the cover is adapted to at least partially covers the windowpane,
   wherein the cover further comprises a rigid load-bearing section that accommodates at least one sun visor, which can also be moved from the non-use position into the use position; and
   a latching mechanism adapted to latch the cover in one of a plurality of positions,
   wherein a sun visor is adapted to interact with the latching mechanism in such a way that the cover can only be moved from the use position into the non-use position if the sun visor is in the non-use position.

2. The motor vehicle according to claim 1, wherein the rigid load-bearing section is plate-shaped.

3. The motor vehicle according to claim 1, wherein the cover also comprises a deployable tarpaulin that is secured to the rigid load-bearing section.

4. The motor vehicle according to claim 1, wherein the rigid load-bearing section comprises at least one of a depression or a recess in which a sun visor is housed in the non-use position.

5. The motor vehicle according to claim 4, wherein a tarpaulin is secured to the rigid load-bearing section in such a way that the tarpaulin is adapted to cover the recess on its side facing the windowpane.

6. The motor vehicle according to claim 1, wherein the protective sunscreen comprises a first guide rail and a second guide rail opposing the first guide rail in which the rigid load-bearing section slides.

7. The motor vehicle according to claim 1, wherein a light is provided on the rigid load-bearing section for illuminating at least one of a vehicle interior or a sun visor.

8. The motor vehicle according to claim 7, wherein the light is arranged inside at least one of a depression or a recess.

9. The motor vehicle according to claim 7, further comprising
   a first guide rail and a second guide rail configured to guide the cover between the non-use position and the use position;
   electric lines mounted in the rigid load-bearing section; and
   a sliding contact electrically coupling the electric lines and at least one of the first guide rail or the second guide rail,
   wherein the light is supplied with power via the at least one of the first guide rail or the second guide rail, the sliding contact, and the electric lines.

10. The motor vehicle according to claim 1, further comprising a retaining area between a roof ceiling and vehicle roof, in which the rigid load-bearing section is at least partially arranged with the cover in the non-use position.

11. The motor vehicle according to claim 10, wherein a sun visor is completely housed in the retaining area in the non-use position if the cover is in the non-use position.

12. The motor vehicle according to claim 1, wherein the latching mechanism is provided on the rigid load-bearing section.

13. The motor vehicle according to claim 12, wherein the latching mechanism comprises a moving locking bar that is incorporated in at least one of a recess or a depression in at least one of a first guide rail or a second guide rail when in a latched position.

14. The motor vehicle according to claim 13, wherein the moving locking bar is pre-loaded in the latched position.

15. The motor vehicle according to claim 1, further comprising an actuator adapted to activate the latching mechanism is arranged on the rigid load-bearing section.

16. The motor vehicle according to claim 15, wherein the actuator is arranged so that it can be accessed with the cover in the non-use position.

17. The motor vehicle according to claim 1, wherein the windowpane is at least one of a sunroof pane, a windshield or a panoramic windowpane.

18. A motor vehicle, comprising:
    a windowpane;
    a protective sunscreen for the windowpane; and
    a cover for the protective sunscreen adapted for movement from a non-use position into a use position, in which the cover is adapted to at least partially covers the windowpane,
    wherein the cover further comprises a rigid load-bearing section that accommodates at least one sun visor, which can also be moved from the non-use position into the use position,
    wherein the rigid load-bearing section comprises at least one of a depression or a recess in which a sun visor is housed in the non-use position, and
    wherein a tarpaulin is secured to the rigid load-bearing section in such a way that the tarpaulin is adapted to cover the recess on its side facing the windowpane.

* * * * *